M. CHLADEK.
TREE TRIMMING SHEARS.
APPLICATION FILED JULY 20, 1917.
1,275,529.
Patented Aug. 13, 1918.
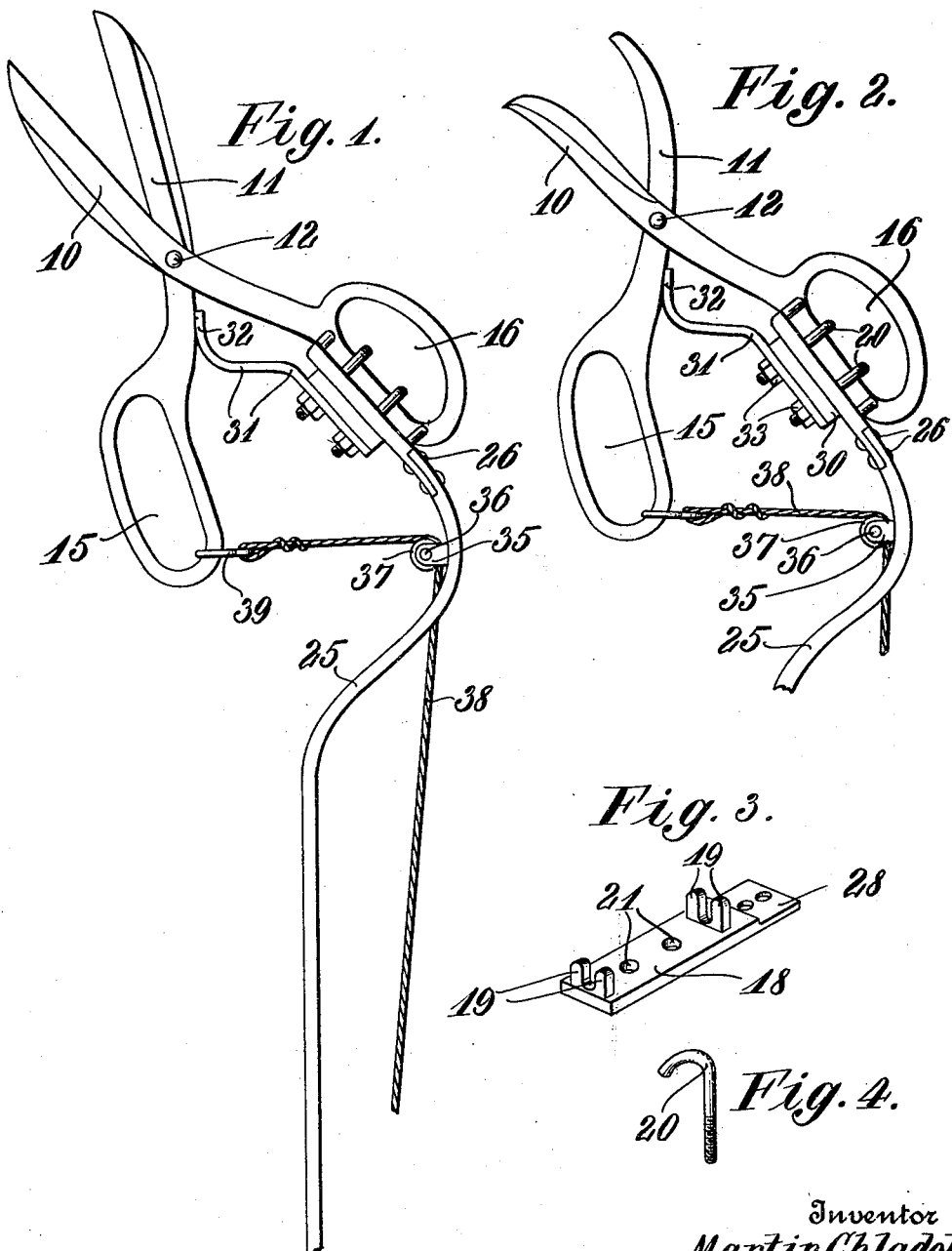
Inventor
Martin Chladek.
By his Attorney
Oscar Geier

UNITED STATES PATENT OFFICE.

MARTIN CHLADEK, OF SHAMOKIN, PENNSYLVANIA.

TREE-TRIMMING SHEARS.

1,275,529.  Specification of Letters Patent.  Patented Aug. 13, 1918.

Application filed July 20, 1917. Serial No. 181,722.

*To all whom it may concern:*

Be it known that I, MARTIN CHLADEK, a subject of the King of Hungary, resident of Shamokin, county of Snyder and State of Pennsylvania, have invented certain new and useful Improvements in Tree-Trimming Shears, of which the following is a specification.

This invention relates to improvements for devices for trimming the boughs, limbs or foliage of trees, shrubs, and the like, such as are not readily accessible from the ground.

The principal object of the invention is to provide means which may be attached to commercial shears of a suitable character without in any way damaging them, and which may be operated by a single individual with entire ease.

Another object is the shear holding means with a saw holder and means for its operation, the attachment being interchangeably engaged with either shears or saw.

These and other like objects are attained by the novel construction and combination of parts hereafter described and shown in the accompanying drawings, forming a material part of this disclosure, and in which:—

Figure 1 is a side elevational view of a pair of shears to which the attachment is applied and indicating its operation.

Fig. 2 is a similar view showing a different form of shear,

Fig. 3 is a perspective view of the clamp plate by means of which the attachment to the shears is made, and Fig. 4 is a view of the hook bolt used in connection therewith.

In Figs. 1 and 2, the shear blades 10 and 11 are pivoted at the central point by the rivet pin 12, so as to cross each other in the ordinary manner, the shank having eyes 15 and 16 through which the hand or fingers of the operator can be inserted when using the shears in the ordinary manner.

A plate 18 is adapted to be engaged with the inner side of the shear shank or handle 16, the shank being tightly held between raised projections 19 and is further secured to the plate by means of hook bolts 20, passing through appropriately formed openings 21 in the plate, the hooked portion engaging in the opening so as to hold the shears rigidly. A handle or pole 25 is used to manipulate the shears, the same having a reduced end engaged by rivets 26 to the extension 28 formed with the plate 18.

A block 30 is arranged on the back of the plate 18, carrying a flat spring 31, the free end 32 of which abuts against the inner side of the shank formed with the blade 11, thereby keeping the shears in a normally open position, the block between the spring and the plate being secured by the stems of the hook bolts and held by the nuts 33.

Formed with the handle 25 are a pair of lugs 35, carrying a pin 36, upon which is mounted a pulley 37, over which runs a cord 38, engaged by means of a hook 39 or the like to the opposite shear handle, it being understood that the length of the cord 38 is substantially equivalent to the length of the handle 25, by means of which the apparatus is maneuvered.

In operation, the handle being grasped by the user, the cord 38 is pulled, closing the shear blades together, opposing the spring 31, which immediately opens the shears when the cut has been made.

The application of the invention is believed to be obvious from the foregoing, taken in connection with the drawings.

Having thus described my invention, what I claim as new, and desire to secure by Letters Patent, is:—

The combination with a pair of shears, of a plate, forks formed on said plate adjacent the ends thereof and engaging one of the handles of said shears, said plate having openings therein, hooks carried by the plate and passing through certain of the openings and engaging the same handle of the shears as that engaged by the plate, one end of the plate being offset, a third handle secured to the offset of said plate, a spring carried by the plate for forcing the shears to open position, and means for closing the shears.

In testimony whereof I have affixed my signature.

MARTIN CHLADEK.

Copies of this patent may be obtained for five cents each, by addressing the "Commissioner of Patents, Washington, D. C."